(12) United States Patent
Harley et al.

(10) Patent No.: US 7,978,173 B2
(45) Date of Patent: Jul. 12, 2011

(54) POINTING DEVICE INCLUDING A MOVEABLE PUCK WITH MECHANICAL DETENTS

(75) Inventors: Jonah A. Harley, Mountain View, CA (US); John Stewart Wenstrand, Menlo Park, CA (US); Storrs T. Hoen, Brisbane, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 889 days.

(21) Appl. No.: 11/036,541

(22) Filed: Jan. 14, 2005

(65) Prior Publication Data

US 2006/0158429 A1 Jul. 20, 2006

(51) Int. Cl.
G09G 5/08 (2006.01)

(52) U.S. Cl. ........ 345/157; 345/161; 345/163; 345/167; 715/856; 463/22; 463/23

(58) Field of Classification Search .......... 345/156–167, 345/184; 715/856; 463/22, 23
See application file for complete search history.

(56) References Cited

U.S. PATENT DOCUMENTS

| | | | | |
|---|---|---|---|---|
| 2,255,582 A | * | 9/1941 | Hackett et al. | 192/219.2 |
| 3,226,999 A | * | 1/1966 | Allison | 74/527 |
| 3,987,685 A | | 10/1976 | Opocensky | |
| 4,670,743 A | | 6/1987 | Zemke | |
| 4,719,455 A | | 1/1988 | Louis | |
| 5,056,146 A | | 10/1991 | Nishide | |
| 5,086,296 A | | 2/1992 | Clark | |
| 5,252,952 A | | 10/1993 | Frank et al. | |
| 5,504,502 A | * | 4/1996 | Arita et al. | 345/160 |
| 5,659,334 A | | 8/1997 | Yaniger | |
| 5,703,356 A | | 12/1997 | Bidiville et al. | |
| 5,704,037 A | | 12/1997 | Chen | |
| 5,734,373 A | * | 3/1998 | Rosenberg et al. | 345/161 |
| 5,739,821 A | | 4/1998 | Ho et al. | |
| 5,760,764 A | * | 6/1998 | Martinelli | 345/160 |
| 5,771,037 A | * | 6/1998 | Jackson | 345/157 |
| 5,808,603 A | | 9/1998 | Chen | |
| 5,815,139 A | | 9/1998 | Yoshikawa et al. | |
| 5,831,554 A | * | 11/1998 | Hedayat et al. | 341/20 |
| 5,889,507 A | | 3/1999 | Engle et al. | |
| 5,914,465 A | | 6/1999 | Allen | |
| 5,956,016 A | * | 9/1999 | Kuenzner et al. | 345/156 |
| 6,075,522 A | * | 6/2000 | Milroy | 345/184 |
| 6,084,570 A | * | 7/2000 | Milroy | 345/157 |
| 6,096,984 A | | 8/2000 | Howell | |
| 6,115,030 A | | 9/2000 | Berstis et al. | |

(Continued)

FOREIGN PATENT DOCUMENTS

DE    19710686    9/1998

(Continued)

OTHER PUBLICATIONS

International Search Report from corresponding application number PCT/US06/02992.

(Continued)

*Primary Examiner* — Lun-Yi Lao
*Assistant Examiner* — Gregory J Tryder (57) ABSTRACT

A pointing device includes a moveable puck that is capable of moving over a surface in a puck field of motion. The surface includes a detent feature defined within the puck field of motion for engaging with a detent feature of the moveable puck.

15 Claims, 5 Drawing Sheets

U.S. PATENT DOCUMENTS

| | | | |
|---|---|---|---|
| 6,198,473 B1 | 3/2001 | Armstrong | |
| 6,256,012 B1 | 7/2001 | Devolpi | |
| 6,278,440 B1 * | 8/2001 | Katsurahira et al. | 345/163 |
| 6,288,707 B1 | 9/2001 | Philipp | |
| 6,292,174 B1 | 11/2001 | Mallett et al. | |
| 6,326,948 B1 * | 12/2001 | Kobachi et al. | 345/157 |
| 6,492,911 B1 | 12/2002 | Netzer | |
| 6,667,733 B2 | 12/2003 | Miyoshi | |
| 6,753,848 B2 | 6/2004 | Toshiharu | |
| 6,762,748 B2 * | 7/2004 | Maatta et al. | 345/157 |
| 6,816,154 B2 | 11/2004 | Wong et al. | |
| 6,961,052 B1 | 11/2005 | Vaziri | |
| 7,042,441 B2 | 5/2006 | Adams et al. | |
| 7,046,230 B2 | 5/2006 | Zadesky et al. | |
| 7,123,028 B2 | 10/2006 | Okada et al. | |
| 7,158,115 B2 | 1/2007 | Harley et al. | |
| 2002/0003528 A1 * | 1/2002 | Rosenberg et al. | 345/157 |
| 2003/0048262 A1 | 3/2003 | Wu et al. | |
| 2003/0076301 A1 | 4/2003 | Tsuk et al. | |
| 2003/0095096 A1 | 5/2003 | Robbin et al. | |
| 2004/0080487 A1 * | 4/2004 | Griffin et al. | 345/156 |
| 2004/0108993 A1 | 6/2004 | Suzuki et al. | |
| 2005/0052425 A1 | 3/2005 | Zadesky et al. | |
| 2005/0052426 A1 | 3/2005 | Hagermoser et al. | |
| 2005/0052429 A1 | 3/2005 | Philipp | |
| 2005/0062732 A1 | 3/2005 | Sinclair et al. | |
| 2005/0110755 A1 * | 5/2005 | Harley et al. | 345/160 |
| 2005/0110765 A1 * | 5/2005 | Baeza | 345/173 |
| 2006/0001657 A1 | 1/2006 | Monney et al. | |
| 2006/0038783 A1 | 2/2006 | Shaw et al. | |
| 2006/0176270 A1 | 8/2006 | Sachs | |
| 2006/0290665 A1 * | 12/2006 | Matta et al. | 345/157 |
| 2007/0052691 A1 | 3/2007 | Zadesky et al. | |

FOREIGN PATENT DOCUMENTS

| | | |
|---|---|---|
| GB | 2247938 | 3/1992 |
| JP | 2003/84916 | 3/2003 |
| WO | WO-03/030092 | 4/2003 |
| WO | WO-2006/031332 | 3/2006 |

OTHER PUBLICATIONS

U.S. Appl. No. 10/723,957, filed Nov. 2003, Harley.
U.S. Appl. No. 11/407,274, filed Apr. 2006, Orsley.
U.S. Appl. No. 11/606,556, Nov. 2007, Harley et al.
U.S. Appl. No. 11/923,653, filed Oct. 2007, Orsley.
U.S. Appl. No. 60/794,723, Apr. 2006, Harley.
"3M Double Coated tapes", 9731 931RW Technical Data Feb. 2005.
"ARS Technica, iPod nano", http://arstechnica.corn/reviews/ardware/nano.ars/4, Sep. 2005.
"Motorola SLVR", www.motorola.com/motoinfo/product/details.jsp 2007.
Avago Technologies, "AMRI-2000 Data Sheet", 2005.
Avago Technologies, "AMRI-2000-P000 Data Sheet", Sep. 25, 2007.
Panasonic, "Panasonic Tactile Sheet Type ESP", Dec. 2005.

* cited by examiner

POINTING DEVICE INCLUDING A MOVEABLE PUCK WITH MECHANICAL DETENTS

CROSS REFERENCE TO RELATED APPLICATION

This Nonprovisional Application for Patent is related by subject matter to Nonprovisional U.S. application patent Ser. No. 10/723,957, entitled "Compact Pointing Device," which was filed on Nov. 24, 2003.

BACKGROUND OF THE INVENTION

Traditional pointing devices for controlling the position of a cursor on a display include arrow keys, function keys, mice, track balls, joysticks, j-keys, touch screens, light pens, tablets and other similar devices for controlling cursor movement and selecting items or functions on the display. Although these traditional pointing devices are generally satisfactory for many applications, in environments where the pointing device must operate in a limited workspace and fit within the form factor of an electronic device, such as a laptop computer, personal digital assistant (PDA), wireline or wireless telephone, video game or other similar electronic device, traditional pointing devices do not provide sufficient cursor control speed or accuracy.

Recently, puck-type pointing devices have been introduced to the laptop and hand held device industries to overcome many of the limitations of earlier pointing devices. Puck-type pointing devices are compact puck-shaped devices that may be manipulated by a user's finger to move within a puck field of motion. The position of the puck in the puck field of motion is sensed using a variety of electrical, electromagnetic and optical techniques, and the position of the puck is mapped to a cursor position on a display. Examples of puck-type pointing devices are described in U.S. Pat. No. 6,084,570 to Milroy, entitled "Compact Cursor Controller Structure For Use With Laptop, Notebook and Hand-Held Computers and Keyboards," U.S. Pat. No. 5,771,037 to Jackson, entitled "Computer Display Cursor Controller," U.S. Pat. No. 6,278,440 to Katsurahira et al., entitled "Coordinate Input Apparatus and Position-Pointing Device," and U.S. patent application Ser. No. 10/723,957 to Harley et al., entitled "Compact Pointing Device."

Although existing puck-type pointing devices are faster and more accurate than other traditional pointing devices in the portable electronic device industry, effective operation of a puck-type pointing device requires visual feedback to the user to locate menu items and other software-defined keys on the display. However, for some applications, it is desirable to locate display items without looking at the display. For example, when driving, a user may prefer to select a menu item or dial numbers on a software keypad using only tactile feedback in order to maintain visual contact with the road.

In addition, most puck-type pointing devices include one or more buttons or other type of selection mechanism for selecting items on the display. However, during a "clicking event" in which item selection depends on positioning the cursor over the item on the display and simultaneously clicking or tapping the button or other selection mechanism, many users have found that is difficult to maintain the position of the puck over the item while clicking, thereby resulting in incorrect item selections.

SUMMARY OF THE INVENTION

Embodiments of the present invention provide a pointing device including a moveable puck that is capable of moving over a surface in a puck field of motion. The surface includes a detent feature defined within the puck field of motion for mechanically engaging with at least a portion of the moveable puck.

In one embodiment, the detent feature is an indentation in the surface mapping to a cursor position on a display, and the moveable puck includes a protruding element in sliding contact with the surface. The indentation in the surface is capable of mating with the protruding element when the moveable puck is positioned over the indentation to enable selection of a selectable item on the display corresponding to the location of the indentation in the surface.

In another embodiment, the moveable puck includes a spring-loaded protrusion in sliding contact with the surface containing one or more indentations to enable selection of a selectable item on the display. In a further embodiment, the surface includes an annular indentation for defining a barrier between different modes of operation. In one embodiment, motion of the moveable puck outside of the annular indentation causes the cursor on the display to operate in a joystick mode.

In yet another embodiment, the detent feature is an annular indentation on the surface mapping to a cursor position on a display, and the moveable puck includes an annular ridge capable of mating with the annular indentation when the moveable puck is positioned over the annular indentation to enable selection of a selectable item on the display by a user.

In a further embodiment, the detent feature on the surface is an indentation, and the moveable puck includes a fixed protrusion surrounded by a compliant layer. Upon the application of a predetermined force to the moveable puck, the compliant layer compresses to allow the fixed protrusion to mate with the indentation in the surface.

In a still further embodiment, the detent feature is a protrusion element on the surface mapping to a cursor position on a display, and the moveable puck includes an indentation capable of mating with the protrusion element when the moveable puck is positioned over the protrusion element.

In an additional embodiment, the surface includes an indentation having edge including at least one scalloped region shaped to receive at least a portion of the moveable puck. Each scalloped region maps to a selectable item on a display.

Advantageously, embodiments of the present invention provide non-visual tactile feedback to a user to assist in selecting ("clicking on") items on the display, such as menu items or software keypad numbers. In addition, embodiments of the present invention provide a central region within the field of motion of the puck where the puck position maps directly to a cursor position, and a peripheral region within the field of motion of the puck where the puck position maps to cursor velocity, such as in a joystick mode. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

Figure 1:
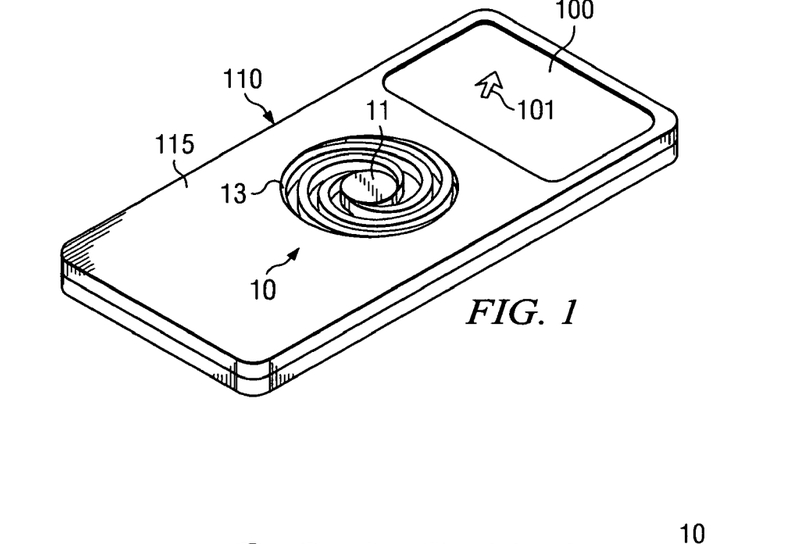
FIG. 1 is a pictorial representation of a computing device implementing an exemplary puck-type pointing device, in accordance with embodiments of the present invention.

FIG. 1 is a pictorial representation of an electronic device 110 implementing an exemplary puck-type pointing device 10, in accordance with embodiments of the present invention. The electronic device 110 shown in FIG. 1 is a wireless telephone, such as a cellular telephone or a handset of a cordless telephone. However, it should be understood that the present invention is applicable to any type of electronic device in which a pointing device 10 is included. For example, various electronic devices 10 include laptop computers, personal digital assistants (PDAs), notebooks, handheld video game devices, remote controls, portable music players or other similar electronic devices.

The pointing device 10 in FIG. 1 is shown located on a top surface 115 of the wireless telephone 110. However, it should be understood that in other embodiments, the pointing device 10 can be located on a side surface or bottom surface of the wireless telephone 10, or for other types of electronic devices, can be located on a different device in communication with the electronic device 10. For example, the pointing device 10 can be located on a mouse-type device, a remote control, a keyboard or other similar device.

The pointing device 10 is operable to control the position of a cursor 101 on a display 100 of the wireless telephone 10. The pointing device 10 includes a puck 11 that is moveable in response to a generally parallel (hereinafter termed "lateral") force applied to the puck 11. The magnitude and direction of movement of the puck 11 determines the magnitude and direction of movement of the cursor 101 on the display 100. The pointing device 10 further includes springs 13 that connect the puck 11 to the top surface 115 of the wireless telephone 10. The springs 13 operate to return the puck 11 to a centered position upon release of the lateral force on the puck 11. Releasing the lateral force on the puck may or may not change the position of the cursor 101 on the display 100.

Figure 2A:
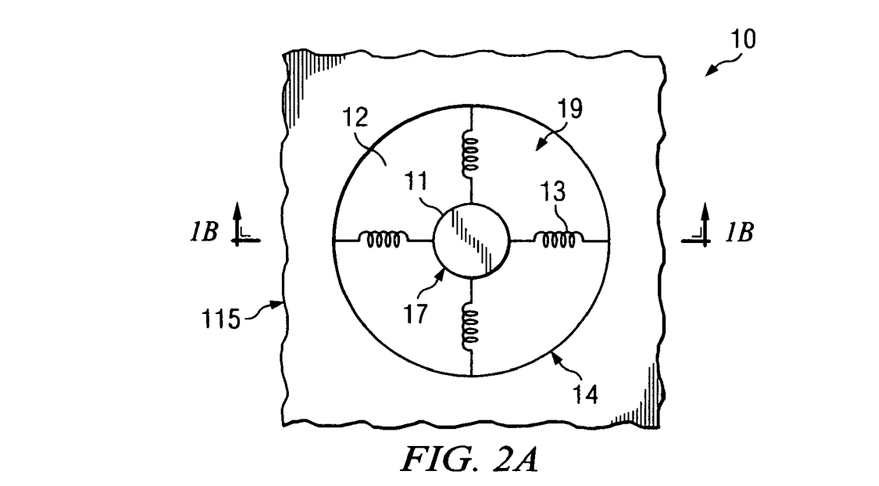
FIG. 2A is a top view of an exemplary puck-type pointing device, in accordance with embodiments of the present invention.
Figure 2B:
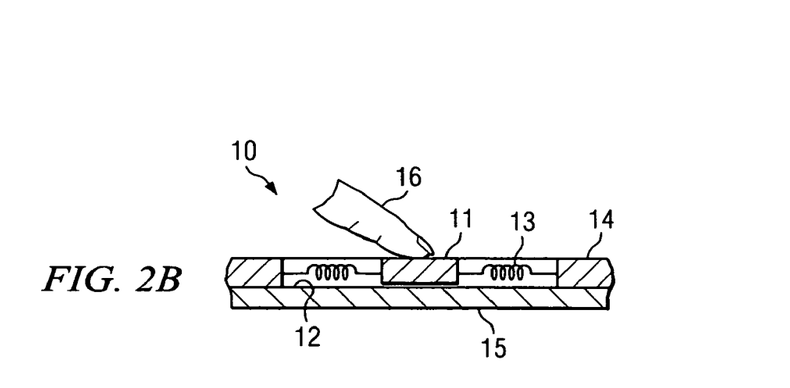
FIG. 2B is a cross-sectional view of the puck-type pointing device of FIG. 2A, in accordance with embodiments of the present invention.

Referring now to FIGS. 2A and 2B, additional features of the puck-type pointing device 10 are illustrated. FIG. 2A is a schematic top view of the puck-type pointing device 10 and FIG. 2B is a cross-sectional view of the puck-type pointing device 10. As discussed above in connection with FIG. 1, the puck-type pointing device 10 includes a puck 11 that is moveable over a surface 12 of a substrate 115 within a puck field of motion 19 in response to a lateral force applied to the puck 11. The lateral force is typically applied to the puck 11 by a user's finger 16, finger tip, thumb, thumb tip or multiple fingers.

In one embodiment, the puck 11 includes a pressure sensor (not shown) that measures the pressure (i.e., generally orthogonal or "vertical" force) applied to the puck 11 by the user, and the puck-type pointing device 10 includes a position sensor (not shown) that determines the displacement of the puck 11 relative to the surface 12 in response to the lateral force applied to the puck 11 by the user. In one embodiment, the pressure sensor in the puck 11 is operable to sense two predetermined pressure levels. A first pressure level activates the tracking of the cursor 101 (shown in FIG. 1) on the display, as described above. In addition, the actuation of the tracking of the cursor on the display due to the detection of the first pressure level also activates the position sensor. A second pressure level activates a "click" function associated with a conventional mouse. For example, a user can click at the current position of the cursor by increasing the vertical pressure applied to the puck 11. In other embodiments, a tactile feedback mechanism can also be included in the puck 11 to provide tactile feedback to the user that the user has applied sufficient vertical pressure at or above the second pressure level to activate the "clicking" function.

When the user releases the puck 11 by removing the user's finger 16, the puck 11 is returned to a center position 17 by the springs 13 that connect the puck 11 to a perimeter 14 of the puck field of motion 19. The perimeter 14 of the puck field of motion 19 is typically connected to the surface 115 of the electronic device on which the pointing device 10 is located. Since the user's finger 16 is not applying vertical pressure to the puck 11, the pressure sensor is not activated during the return of the puck 11 to the center position 17, and any change in position associated with the return motion is not reported by the position sensor to the electronic device.

Figure 3A:
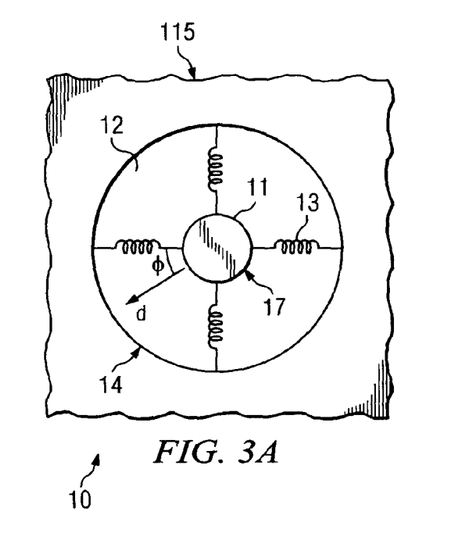
FIGS. 3A-3B illustrate cursor control by the puck-type pointing device of FIGS. 2A and 2B, in accordance with embodiments of the present invention.
Figure 3B:
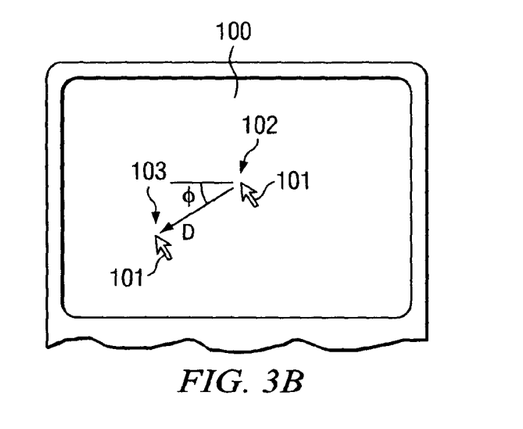

FIGS. 3A-3B illustrate cursor control by the puck-type pointing device of FIGS. 2A and 2B, in accordance with embodiments of the present invention. As discussed above, when the user applies vertical pressure to the puck 11 that is greater than the predetermined first pressure level, any change in the lateral position of the puck 11 relative to the surface 12 is sensed by the position sensor and reported to the electronic device of which the pointing device 10 forms a part. The reported change in position is used by the electronic device to move a cursor 101 on the display 100 by a magnitude and direction corresponding to the magnitude and direction of the motion of the puck 11.

For example, as shown in FIGS. 3A and 3B, if the motion of the puck 11 is characterized by a magnitude d and a direction defined by an angle $\phi$ on the pointing device 10, the motion of the cursor 101 from a current position 102 to a new position 103 on the display 100 is characterized by a magnitude D and a direction defined by an angle $\phi$ on the display 100. When the user releases the vertical pressure on the puck 11, the puck 11 is returned to its centered position 17 by the springs 13 attached to the puck 11. Without vertical pressure applied to the puck 11, the pressure sensor inhibits the position sensor from reporting the change in position of the puck 11 to the electronic device. Therefore, the cursor 101 remains at position 103.

Figure 4:
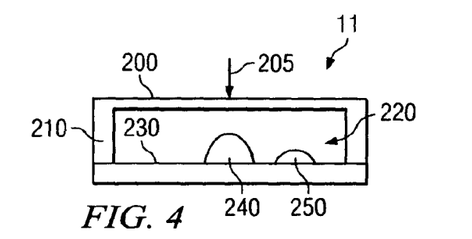
FIG. 4 is a cross-sectional view of a puck including switches capable of providing a "clicking" function, in accordance with embodiments of the present invention.

An example of a pressure sensor is shown in FIG. 4. As can be seen in FIG. 4, the puck 11 includes a moveable element 200 that is suspended over a cavity 220. The distance between the moveable element 200 and a bottom 230 of the cavity 220 changes in response to vertical pressure 205 applied by a user to the top surface of the moveable element 200. In the embodiment shown in FIG. 4, the moveable element 200 is a deformable membrane suspended from spacers, shown at 210. The distance that the moveable element 200 has traveled from a resting position is a measure of the vertical pressure 205 applied to the moveable element 200.

This distance can be sensed by any suitable pressure sensor. For example, as shown in FIG. 4, the pressure sensor can be implemented using two pressure switches 240 and 250. Each pressure switch 240 and 250 is open (non-conducting) when the vertical pressure 205 applied to the moveable element 200 is less than a predetermined activation pressure value for each switch 240 and 250. In one embodiment, as shown in FIG. 4, the predetermined activation pressure values for each switch 240 and 250 are different. In this embodiment, the deformable membrane transfers vertical pressure from the user's finger to the switches 240 and 250. Each switch 240 and 250 changes state when the applied vertical pressure exceeds the switches' 240 and 250 respective predetermined activation pressure values.

In another embodiment, as shown in FIG. 4, the predetermined activation pressure value for each switch 240 and 250 is the same, and each switch 240 and 250 is operable at a different distance from the rest position of the moveable element 200. In this embodiment, the deformable membrane is elastic, and the vertical pressure applied to the membrane is translated into an approximately proportional displacement of the membrane in the vertical direction. Each switch 240 and 250 changes state when the applied vertical pressure causes the membrane to move sufficiently to make contact with the switch 240 or 250, and the applied pressure exceeds the switch's 240 or 250 activation pressure.

As shown in FIG. 4, as the vertical pressure 205 on the moveable element 200 increases beyond a first predetermined value, the moveable element 200 is pushed downward to engage the switch 240 and change the switch 240 to a conducting state. When the switch 240 is changed to a conducting state, the switch 240 signals the host electronic device that the pointing device has been activated. At this point, the position sensor (not shown) in the puck-type pointing device measures the position (e.g., x/y coordinates) of the puck 11 relative to the surface and transmits the puck position to the host electronic device for alteration of the position of the cursor on the display in response to the puck position.

If the vertical pressure 205 applied to the moveable element 200 is increased beyond a second predetermined value, the switch 250 engages with the moveable element 200 to change the state of the switch 250 to a conducting state. The state of the switch 250 is monitored by either the host electronic device or a controller (not shown) that is part of the pointing device. The state of the switch 250 is used to provide a "clicking" function to click on the current position of the cursor on the display.

In other embodiments, the activation of the cursor tracking and clicking functions can be implemented using a single pressure sensing element that provides an analog measurement of the position of the moveable element 200 relative to the bottom 230 of the cavity 220. For example, the moveable element 200 can include an electrode that forms a capacitor with a corresponding element on the bottom 230 of the cavity 220. As the distance between the moveable element 200 and the bottom 230 of the cavity 220 changes, the capacitance of the capacitor changes. The changes in capacitance can be measured by any of a number of conventional circuits to determine the distance between the moveable element 200 and the bottom 230 of the cavity 220.

In still further embodiments, other pressure sensors can be used, instead of measuring the distance between an elastic moveable element 200 and the bottom 230 of the cavity 220. For example, in one embodiment, the cavity 220 can be filled with a compressible medium, such as foam rubber, and the pressure sensor can operate based on the amount of compression of the compressible medium. In yet another embodiment, a rigid moveable element suspended over a surface by a spring mechanism can be utilized, and the pressure sensor can operate based on the tension in the spring mechanism.

Figure 5:
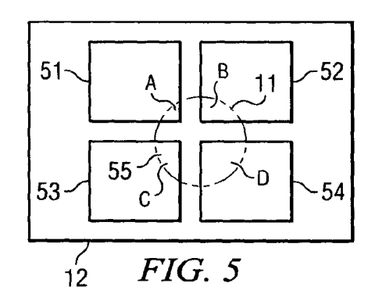
FIG. 5 is a top view of a portion of a surface over which a puck is capable of moving, in accordance with embodiments of the present invention.

An example of a position sensor to sense the lateral position of the puck 11 relative to the surface 12 is shown in FIG. 5. FIG. 5 is a top view of a portion of a surface 12 over which the puck 11 moves. The surface 12 includes four electrodes, shown at 51-54, each having a respective terminal connected to an external circuit. For simplicity, the terminals and external circuit have not been shown.

The puck 11 has a bottom surface that includes an electrode 55, shown in phantom in FIG. 5. Electrodes 51-55 are electrically isolated from one another. For example, in one embodiment, electrode 55 is covered with a layer of dielectric that provides the required insulation while allowing the electrode 55 to slide over the other electrodes. In other embodiments, the electrodes 51-55 can be patterned on the back of the substrate whose surface 12 is shown in FIG. 5.

The overlap between the electrode 55 and each of the electrodes 51-54 is dependent upon the position of the puck 11 relative to the electrodes 51-54. The overlaps are denoted A, B, C and D for electrodes 51, 52, 53 and 54, respectively. The portion of the electrode 55 that overlaps the electrode 51 forms a parallel plate capacitor having a capacitance that is proportional to overlap A. Similarly, the portion of the electrode 55 that overlaps the electrode 52 forms a parallel plate capacitor that has a capacitance proportional to the overlap B, and likewise for electrodes 53 and 54. By measuring the capacitance between electrode 55 and each of the electrodes 51-54, the position of the electrode 55 relative to the electrodes 51-54 can be determined.

It should be understood that the number of electrodes 51-54 on the surface 12 varies depending on the size of the puck field of motion relative to the size of the puck 11. In addition, it should be understood that in other embodiments, other position sensors can be utilized. An example of a different position sensor is an optical position sensor that uses optical sensors to determine the position of the puck 11 relative to the surface 12.

Figure 6:
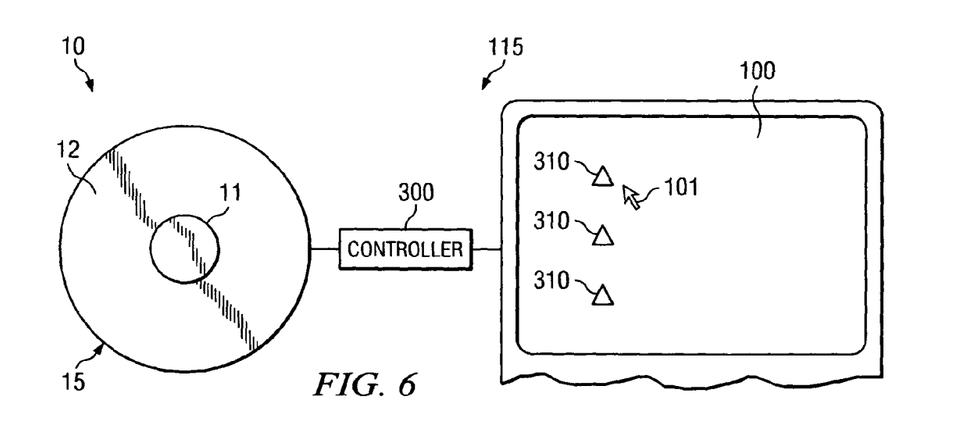
FIG. 6 is a block diagram of an exemplary computing system including a puck-type pointing device for controlling the position of a cursor on a display, in accordance with embodiments of the present invention.

Referring now to FIG. 6, the determination of the position of the puck 11 relative to the surface 12 of the substrate 15 is made by a controller 300, which is part of one or both of the pointing device 10 and the host electronic device 115. The controller 300 receives signals from the pressure sensor and the position sensor, and is operable to provide the position signals used by the electronic device 110 to adjust the position of the cursor 101 on the display 100 accordingly. In addition, in an embodiment in which the pressure sensor provides a "clicking" function, the controller 300 is additionally operable to detect a click event and to provide a click event signal used by the electronic device 110 to select (e.g., open or activate) an application or other function associated with a selected one of items 310 on the display 300 to which the cursor 101 is currently pointing. Items 310 include, but are not limited to, menu items and software keypad numbers.

In order to ensure that one of the items 310 selected by the user on the display 100 is the item 310 that the user desired, embodiments of the present invention provide non-visual tactile feedback to a user to assist in selecting ("clicking on") items 310 on the display 100. The non-visual tactile feedback is produced using mechanical detents that include one or more detent features of the puck 11 and one or more detent features of the substrate 15 of the puck-type pointing device 10. The mechanical detents serve to indicate to the user when the position of the puck 11 relative to the surface 12 corresponds to a position of the cursor 101 pointing to a selectable item 310 on the display 100. In addition, the mechanical detents serve to maintain the position of the puck 11 relative to the surface 12 to enable the user to "click" on the selectable item 310 currently pointed to by the cursor 101.

Figure 7A:
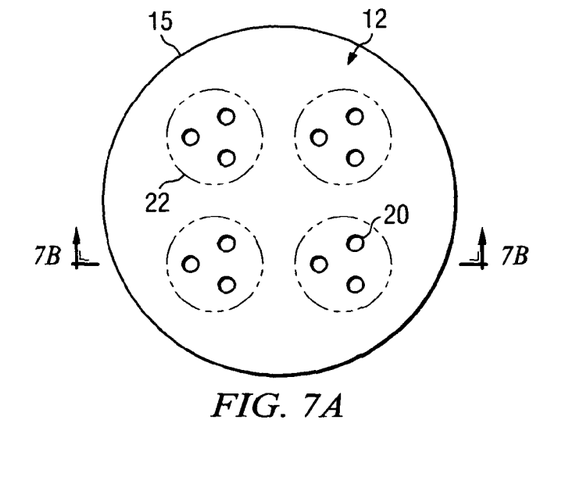
FIG. 7A is a top view of an exemplary substrate of a puck-type pointing device including mechanical detents, in accordance with embodiments of the present invention.
Figures 7B, 9A:
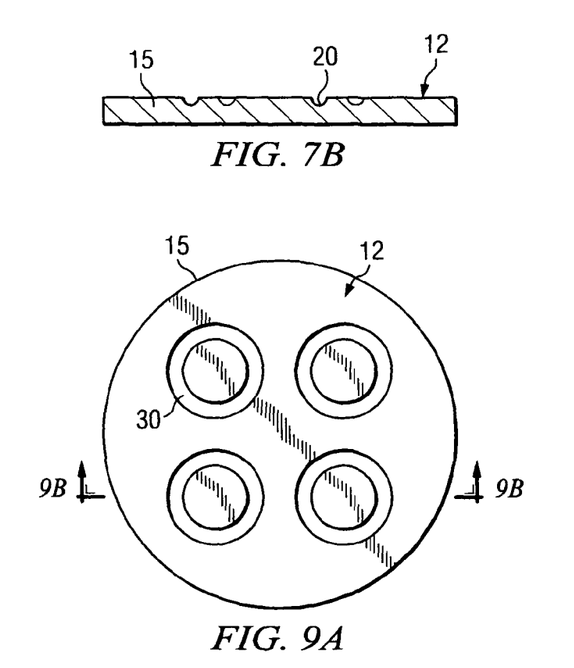
FIG. 7B is a cross-sectional view of the substrate of FIG. 7A, in accordance with embodiments of the present invention.
FIG. 9A is a top view of another exemplary substrate of a puck-type pointing device including mechanical detents in the form of annular indentations, in accordance with embodiments of the present invention.
Figure 8A:
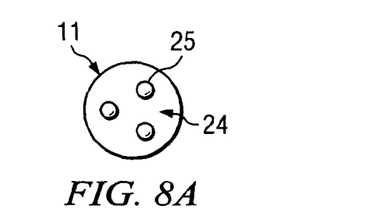
FIG. 8A is a bottom view of an exemplary puck of a puck-type pointing device including a raised pattern for mating with the mechanical detents in the substrate shown in FIG. 7A, in accordance with embodiments of the present invention.
Figure 8B:
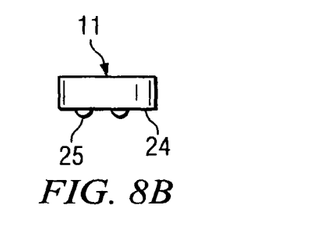
FIG. 8B is a cross-sectional view of the puck of FIG. 8A, in accordance with embodiments of the present invention.

One example of a mechanical detent structure for use in the puck-type pointing device 10 that enables a user to "click" on a selectable item is shown in FIGS. 7A, 7B, 8A and 8B. FIG. 7A is a top view of an exemplary substrate 15 of a puck-type pointing device 10, and FIG. 7B is a cross-sectional view of the substrate of FIG. 7A. FIG. 8A is a bottom view of an exemplary puck 11, and FIG. 8B is a cross-sectional view of the puck 11 of FIG. 8A. The mechanical detents are formed of indentations 20 in the surface 12 of the substrate 15 and protruding elements (e.g., fixed protrusions) 25 protruding from a bottom surface 24 of the puck. The indentations 20 are shown grouped by threes, and each group 22 of indentations corresponds to a location of a selectable item on the display. A pattern of three fixed protrusions 25 protruding from the bottom surface 24 of the puck is capable of mating with one of the groups 22 of indentations 20 in the surface 12 of the substrate 15 shown in FIG. 7A to form a mechanical detent. Thus, a single mechanical detent includes one of the groups 22 of indentations 20 engaged with the three fixed protrusions 25 on the puck 11.

When the puck 11 is positioned over one of the groups 22 of indentations 20, each fixed protrusion 25 mates with a corresponding indentation 20 in the group 22 to maintain the position of the puck 11 over the group 22 of indentations 20 corresponding to a selectable item on the display, and enable selection of the selectable item by the user. The pattern shown in FIGS. 8A and 8B includes three fixed protrusions 25 to prevent rocking of the puck 11 over the substrate 15. With fewer than three fixed protrusions 25, depending on the size of the fixed protrusions 25, the puck 11 may rock, which can affect the position sensor in the puck 11. However, it should be understood that in other embodiments, one or two fixed protrusions 25 can be included on the bottom surface 24 of the puck 11, and corresponding groups of indentations 20 can be included on the surface 12 of the substrate 25, to increase the number of potential selectable items.

The depth of the indentations 20, along with the sharpness of the edges of the indentations 20, determines the type and amount of tactile feedback provided to the user and the ease with which a user can move the puck 11 in and out of the indentations 20. In one embodiment, the fixed protrusions have a radius of 1 mm, and protrude 0.15 mm below the puck surface to engage with indentations in a substrate 0.5 mm thick. In addition, in a further embodiment, the area of each indentation 20 is larger than the area of each fixed protrusion 25 to create respective detents. For example, the area of each indentation 20 can be approximately 50 percent larger than the area of each fixed protrusion to facilitate easy location. However, it should be understood that the size of the puck 11 and substrate 15, the size and depth of each of the indentations 20 and the size of each fixed protrusion 25 varies depending on the type of electronic device including the puck-type pointing device, the physical layout of the electronic device, the software applications used by the electronic device, the number of selectable items on the display and the desired tactile feedback.

The above-described embodiment illustrates one example of a mechanical detent structure implemented with indentations and protruding elements to maintain the current position of the puck 11. However, it should be understood that numerous other mechanical detent structures can be used in the present invention. For example, in another embodiment, the fixed protrusions can be located on the surface 12 of the substrate 15 and the indentations can be located on the bottom surface 24 of the puck 11. In still another embodiment, generally parallel indentations can be provided in the surface 12 of the substrate 15 that are capable of mating with a corresponding protruding element on the puck 11.

Figure 9B:
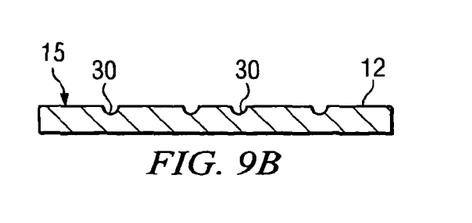
FIG. 9B is a cross-sectional view of the substrate of FIG. 9A, in accordance with embodiments of the present invention.

The mechanical detents illustrated in FIGS. 7A-8B are adequate for many applications. However, the mechanical detents are dependent on the puck orientation, which may be variable. Another example of a mechanical detent structure that exhibits rotational independence is shown in FIGS. 9A, 9B, 10A and 10B. FIG. 9A is a top view of a surface 12 of an exemplary substrate 15 of a puck-type pointing device including annular indentations 30, in accordance with embodiments of the present invention. FIG. 9B is a cross-sectional view of the substrate 15 of FIG. 9A. Each annular indentation 30 corresponds to a location of a selectable item on the display. The annular indentations 30 of FIG. 9A may overlap one another to allow a greater number of selectable locations.

Figure 10A:
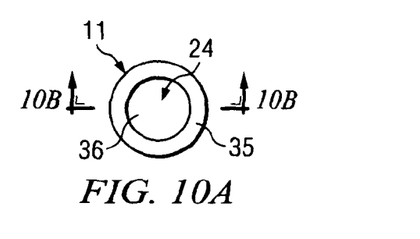
FIG. 10A is a bottom view of an exemplary puck of a puck-type pointing device including a annular ridge for mating with the detents in the substrate shown in FIG. 9A, in accordance with embodiments of the present invention.
Figure 10B:
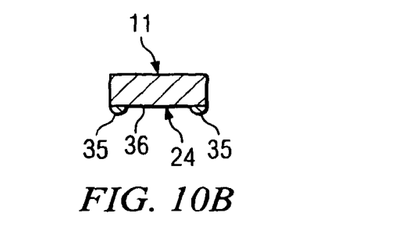
FIG. 10B is a cross-sectional view of the puck of FIG. 10A, in accordance with embodiments of the present invention.

As shown in FIGS. 10A and 10B, the puck 11 has a bottom surface 24 including an annular ridge 35 for mating with one of the annular indentations 30 in the surface 12 of the substrate 15 shown in FIG. 9A to form a mechanical detent. Thus, a single mechanical detent includes one of the annular indentations 30 engaged with the annular ridge 35. When the puck 11 is positioned over one of the annular indentations 30, the annular ridge 35 mates with the annular indentation 30 to maintain the position of the puck 11 at the annular indentation 35 corresponding to a selectable item on the display, thereby enabling selection of the selectable item by the user.

The depth of the annular indentations 30, along with the sharpness of the edges of the annular indentations 30, determines the type and amount of tactile feedback provided to the user and the ease with which the user can move the puck 11 in and out of the annular indentations 30. It should be understood that the size of the puck 11, and the size and depth of each of the annular indentations 30 varies depending on the type of electronic device including the puck-type pointing device, the physical layout of the electronic device, the software applications used by the electronic device, the number of selectable items on the display and the desired tactile feedback.

The above-described embodiment illustrates an example of a rotationally-independent mechanical detent structure for maintaining the current position of the puck 11. However, it should be understood that numerous other rotationally-independent mechanical detent structures can be used, and the present invention is not limited to the particular rotationally-independent structure described above.

It may also be desirable in some circumstances to create a mechanical detent structure that is intentionally dependent on the puck rotation. In the embodiment shown in FIGS. 11A-11C, the mechanical detents can be designed to be tolerant to small rotations of the puck 11, but not to large rotations. This enables a user to disable or modify the mechanical detents by removing the puck and reinstalling the puck 11 with a rotated orientation. An example of a removable puck assembly that includes a base sub-assembly and a puck sub-assembly attached by an attachment mechanism that enables the puck sub-assembly to be reversibly separable from the base sub-assembly is described in co-pending and commonly assigned U.S. patent application Ser. No. 10/722,698, which was filed on Nov. 24, 2003.

Figure 11A:
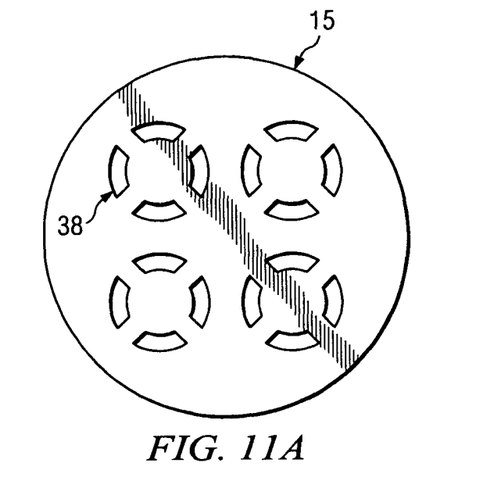
FIG. 11A is a top view of an exemplary substrate of a puck-type pointing device including mechanical detents, in accordance with embodiments of the present invention.
Figure 11B:
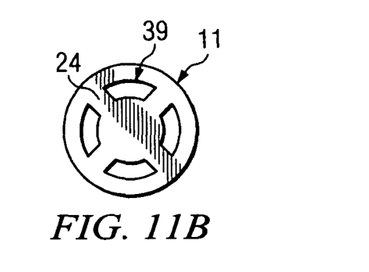
FIG. 11B is a bottom view of an exemplary puck of a puck-type pointing device having a first orientation with respect to the substrate of FIG. 11A.
Figure 11C:
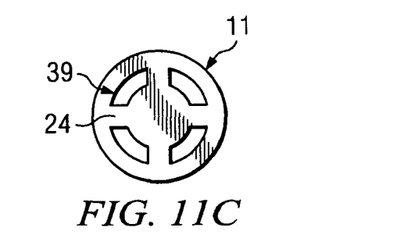
FIG. 11C is a bottom view of an exemplary puck of a puck-type pointing device having a second orientation with respect to the substrate of FIG. 11A.

In FIG. 11A, the substrate 15 includes segmented annular indentations 38. In FIG. 11B, the puck 11 has a bottom surface 24 including a segmented annular ridge 39 for mating with one of the segmented annular indentations 38 on the substrate 15 shown in FIG. 11A to form a mechanical detent. As shown in FIG. 11B, when the puck 11 is positioned in a first orientation with respect to the substrate 15, the segmented annular ridge 39 on the puck 11 can be mated with one of the segmented annular indentations 38 in the substrate. However, as shown in FIG. 11C, when the puck 11 is removed, rotated and reinstalled to have a second orientation with respect to the substrate 15, the segmented annular ridge 39 on the puck 11 is not able to mate with any of the segmented annular indentations 38 in the substrate, thereby disabling the mechanical detents from selecting a selectable option on the display.

Figure 12A:
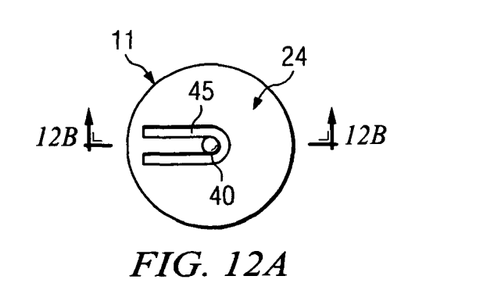
FIG. 12A is a bottom view of an exemplary puck of a puck-type pointing device including a spring loaded dimple for mating with various detents in the substrate, in accordance with embodiments of the present invention.
Figure 12B:
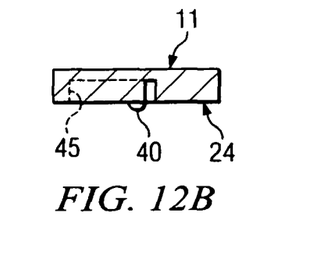
FIG. 12B is a cross-sectional view of the puck of FIG. 12A, in accordance with embodiments of the present invention.

Another exemplary mechanical detent structure is shown in FIGS. 12A-12B. FIG. 12A is a bottom view of an exemplary embodiment of a puck 11 of a puck-type pointing device including a spring-loaded protrusion 40 for mating with various types of indentations on the substrate (not shown) to form a mechanical detent, in accordance with embodiments of the present invention. FIG. 12B is a cross-sectional view of the puck 11 of FIG. 12A. As shown in FIGS. 12A and 12B, the puck 11 has a bottom surface 24 including a spring-loaded protrusion 40 for mating with an indentation in the surface of the substrate. The protrusion 40 is in contact with a U-shaped spring-mechanism 45 attached to the puck 11 at the forked end and attached to the protrusion 40 at the curved end. When pressure is applied to the top surface of the puck 11, the protrusion applies bias to the U-shaped spring-mechanism 45 to enable the protrusion 40 to lie flush with the bottom surface 24 of the puck 11. When the puck 11 is positioned over one of the indentations on the substrate surface, the spring-mechanism 45 applies bias to the protrusion 40 to mate the protrusion 40 with the indentation in the substrate surface. It should be understood that numerous other types of spring-mechanisms can be used, and the present invention is not limited to the U-shaped spring-mechanism 45. For example, a coil spring, leaf spring, non-compression coil spring or any other type of spring-mechanism can be used.

Figure 13:
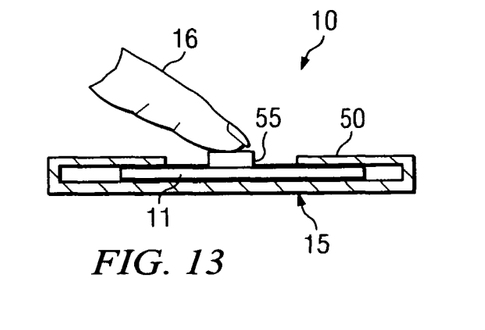
FIG. 13 is a cross-sectional view of a puck-type pointing device including a bezel for applying a downward force on the puck of FIGS. 12A and 12B, in accordance with embodiments of the present invention.

To prevent rocking of the spring-loaded protrusion 40, a constant downward force can be applied to the puck 11 to press the puck 11 onto the substrate. FIG. 13 is a cross-sectional view of a puck-type pointing device 10 including a bezel 50 for applying a downward force on the puck 11 of FIGS. 12A and 12B, in accordance with embodiments of the present invention. A user's finger 16 is shown applying pressure to a button 55 on the top surface of the puck 11. The button 55 serves to direct the movement of the puck 11. In addition, in one embodiment, the button 55 also operates as a clicking device to provide a clicking function.

By applying constant downward force on the puck 11 by the bezel 50, the puck 11 is slidable over the substrate 15 while the puck 11 is positioned over an area on the substrate 15 that lacks any indentations. When the puck is positioned over an indentation in the substrate 15, the spring-loaded protrusion extends from the bottom surface of the puck 11 to mate with the indentation in the substrate 15. The size and depth of the indentations on the surface of the substrate, along with the configuration of the spring-loaded protrusion 40 in the puck 11, determine the amount of force that the user must apply to move the puck 11 out of the indentation.

The above-described embodiment illustrates one spring-loaded mechanical detent structure to maintain the current position of the puck 11. However, it should be understood that numerous other spring-loaded mechanical detent structures can be used, and the present invention is not limited to the particular embodiment described above. For example, the puck 11 can include a fixed protrusion surrounded by a compliant layer. With light pressure, the puck 11 slides on the substrate surface. However, with increased pressure beyond a predetermined threshold, the compliant layer compresses, allowing the protrusion to locate in an indentation in the substrate surface.

Figure 14A:
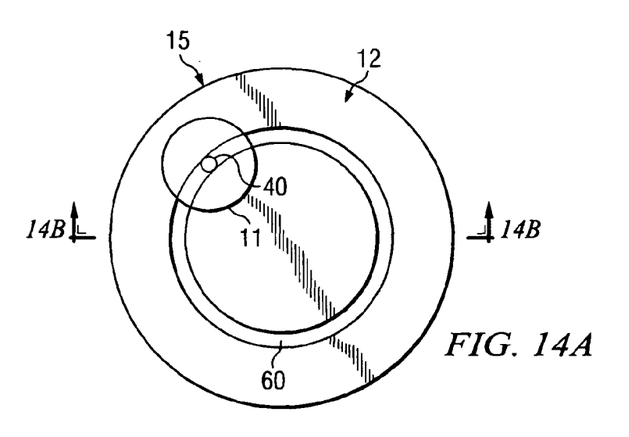
FIG. 14A is a top view of another exemplary substrate of a puck-type pointing device including a large annular indentation to enable the puck-type pointing device to operate in different modes, in accordance with embodiments of the present invention.
Figures 14B, 15, 16:
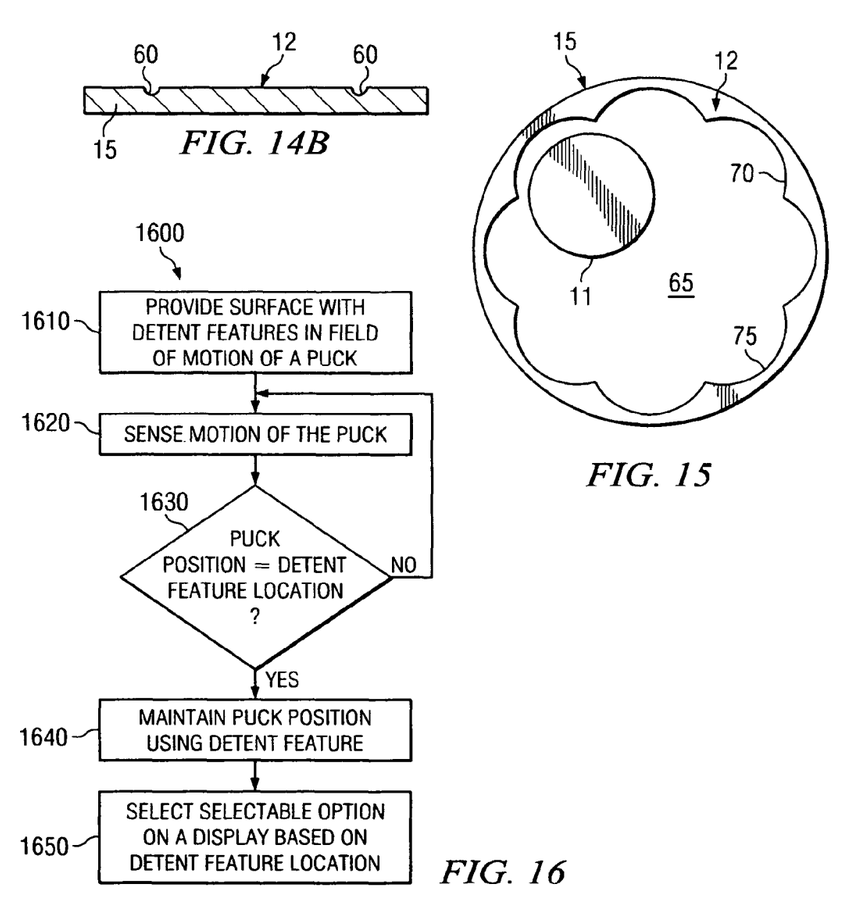
FIG. 14B is a cross-sectional view of the substrate of FIG. 14A, in accordance with embodiments of the present invention.
FIG. 15 is a top view of an exemplary puck-type pointing device including scalloped detents on the substrate, in accordance with embodiments of the present invention.
FIG. 16 is a flow chart illustrating an exemplary process for enabling selection of a selectable item on a display based on the location of the puck relative to the substrate using mechanical detents, in accordance with embodiments of the present invention.

In addition, a spring-loaded mechanical detent structure can be used in conjunction with an annular or other type of mechanical detent structure to create different modes of cursor operation (e.g., cursor tracking mode and joystick mode). An additional exemplary mechanical detent structure capable of operating in two different cursor modes of operation is shown in FIGS. 14A-14B. FIG. 14A is a top view of another exemplary substrate 15 of a puck-type pointing device including a large annular indentation 60 to enable the puck-type pointing device to operate in different modes, in accordance with embodiments of the present invention. FIG. 14B is a cross-sectional view of the substrate 15 of FIG. 14A.

On the surface 12 of the substrate 15 is shown an annular indentation 60 near the perimeter of the substrate 15. The annular indentation 60 divides the surface of the substrate into two regions, a first region that is inside the annular indentation and a second region that is outside the annular indentation 60. Although not specifically shown in FIG. 14A or FIG. 14B, in other embodiments, additional indentations can also be included in the substrate 15 that correspond to one or more locations of selectable items on the display. When the puck 11 is moved a distance from its resting position equal to the radius of the annular indentation 60, the spring-loaded protrusion 40 mates with the annular indentation 60 to provide tactile feedback to the user that the puck 11 is transitioning from a cursor tracking mode to a joystick mode. In one embodiment, motion of the puck 11 outside of the annular indentation 60 causes the cursor on the display to operate in a joystick mode, where the puck position maps to a cursor velocity.

Another exemplary mechanical detent structure in which the detent mechanism is not located on the surfaces of the substrate and the puck is shown in FIG. 15. FIG. 15 is a top view of an exemplary puck-type pointing device including scalloped detent features on the substrate 15, in accordance with embodiments of the present invention. The surface 12 of the substrate 15 includes an indentation 65 having an edge 70 including at least one scalloped region 75 shaped to receive at least a portion of the moveable puck 11. Each scalloped region 75 maps to a selectable item on a display, such as a menu item or a software keypad number. Positioning the moveable puck 11 to engage with one of the scalloped regions 75 enables selection of a selectable item on the display by a user. In FIG. 15, eight such scalloped regions 75 are shown to provide eight distinct locations that can easily be found by feel. However, it should be understood that the number of scalloped regions 75 depends on the application, type of electronic device and other similar factors.

The above-described embodiments illustrate various examples of mechanical detent structures. However, it should be understood that there are numerous other types of detent structures that can be used, and the present invention is not limited to the ones described above. In addition, the above-described embodiments illustrate one example of a puck-type pointing device that includes various mechanical detent structures. However, it should be understood that there are numerous other types of puck-type pointing device that can be used, and the present invention is not limited to the one described above. For example, mechanical detents to provide non-visual tactile feedback can be used with the puck-type pointing devices described in U.S. Pat. No. 6,084,570 to Milroy, entitled "Compact Cursor Controller Structure For Use With Laptop, Notebook and Hand-Held Computers and Keyboards," U.S. Pat. No. 5,771,037 to Jackson, entitled "Computer Display Cursor Controller," and U.S. Pat. No. 6,278,440 to Katsurahira et al., entitled "Coordinate Input Apparatus and Position-Pointing Device."

FIG. 16 is a flow chart illustrating an exemplary process 1600 for selecting a selectable item on a display based on the location of the puck relative to the substrate using mechanical detents, in accordance with embodiments of the present invention. At block 1610, a puck-type pointing device having a puck field of motion over which a puck slides is provided with one or more detent features associated with the puck and the substrate. Each of the detent features on the substrate corresponds to a respective selectable item on a display. Examples of detent features include indentations, protrusion elements (e.g., fixed protrusions and spring-loaded protrusions), annular ridges, annular indentations, scalloped regions and other types of detent features.

When the puck is slidably moved over the surface, the puck-type pointing device senses motion of the puck and determines a current position of the puck relative to the surface at block 1620. At block 1630, if the current puck position is aligned such that the detent features of the puck engage with one of the detent features on the substrate corresponding to a cursor position pointing to a first one of the selectable items on the display, the current puck position is maintained using the detent features of the puck and substrate at block 1640, which enables selection of the first selectable item on the display using the puck-pointing device at block 1650. Otherwise, the puck may continue to be moved over the surface to control the position of the cursor on the display, and the current puck position is sensed by the puck-type pointing device at block 1620.

The innovative concepts described in the present application can be modified and varied over a wide rage of applications. Accordingly, the scope of patents subject matter should not be limited to any of the specific exemplary teachings discussed, but is instead defined by the following claims.

We claim:

1. A pointing device, comprising:
 a surface having a puck field of motion defined thereon; and
 a moveable puck operable to move within said puck field of motion;
 wherein said surface includes a detent structure defined within said puck field of motion for mechanically engaging with at least a portion of said moveable puck;
 wherein said detent structure is an indentation in said surface mapping to a cursor position on a display; and
 wherein said moveable puck includes a protruding element in sliding contact with said surface, said indentation in said surface being capable of mating with said protruding element when said moveable puck is positioned over said indentation to enable selection of a selectable item on the display corresponding to the location of said indentation in said surface.

2. The pointing device of claim 1, wherein said indentation in said surface includes at least three indentations and said protruding element on said moveable puck includes at least three corresponding protrusions.

3. The pointing device of claim 2, wherein each of said indentations has an area larger than an area of a corresponding one of said protrusions.

4. The pointing device of claim 1, wherein said moveable puck is capable of being oriented with respect to said surface to prevent said protruding element from mating with said indentation in said surface.

5. A pointing device, comprising:
a surface having a puck field of motion defined thereon; and
a moveable puck connected to a perimeter of the puck field of motion by springs that allow the moveable puck to move within said puck field of motion;
wherein said surface includes a detent structure defined within said puck field of motion for mechanically engaging with at least a portion of said moveable puck;
wherein said detent structure comprises a protruding element that is fixed on said surface at a fixed location and wherein the protruding element that is fixed on said surface at a fixed location is in sliding contact with said moveable puck, the protruding element mapping to a cursor position on a display; and
wherein said moveable puck includes an indentation, said indentation in said moveable puck mating with said protruding element when said moveable puck is positioned over said protruding element to enable selection of a selectable item on the display corresponding to the location of said protruding element on said surface.

6. The pointing device of claim 5, wherein said indentation in said moveable puck includes at least three indentations and said protruding element of said surface includes at least three corresponding protrusions.

7. The pointing device of claim 6, wherein each of said indentations has an area larger than an area of a corresponding one of said protrusions.

8. The pointing device of claim 5, wherein said indentation and said protruding element are configured so that the indentation and said protruding element do not mate in at least one orientation of the moveable puck with respect to said surface.

9. The pointing device of claim 5, wherein:
when said indentation in said moveable puck is positioned over said protruding element of said surface, said indentation of said moveable puck mates with said protruding element of said surface; and
when said indentation in said moveable puck is not positioned over said protruding element of said surface, said indentation of said moveable puck does not mate with said protruding element of said surface.

10. The pointing device of claim 5, wherein said indentation in said moveable puck is located in a fixed position within the moveable puck.

11. The pointing device of claim 5, wherein said indentation in said moveable puck is located in a fixed position in a surface of the moveable puck.

12. The pointing device of claim 5, wherein said indentation in said moveable puck is an indentation in a surface of the moveable puck.

13. The pointing device of claim 5, wherein said indentation in said moveable puck is an indentation in a bottom surface of the moveable puck.

14. The pointing device of claim 5, wherein said mating of said indentation and said protruding element provides non-visual tactile feedback to a user to assist in selecting the selectable item on the display.

15. The pointing device of claim 5, wherein the springs operate to return the moveable puck to a centered position in the puck field of motion upon release of a lateral force on the moveable puck.

\* \* \* \* \*